(12) United States Patent
Haraguchi

(10) Patent No.: US 6,862,680 B2
(45) Date of Patent: Mar. 1, 2005

(54) MICROPROCESSOR PROCESSING SPECIFIED INSTRUCTIONS AS OPERANDS

(75) Inventor: Yoshiyuki Haraguchi, Tokyo (JP)

(73) Assignee: Renesas Technology Corp., Tokyo (JP)

(*) Notice: Subject to any disclaimer, the term of this patent is extended or adjusted under 35 U.S.C. 154(b) by 558 days.

(21) Appl. No.: 09/956,908

(22) Filed: Sep. 21, 2001

(65) Prior Publication Data

US 2002/0169945 A1 Nov. 14, 2002

(30) Foreign Application Priority Data

May 11, 2001 (JP) ........................................ 2001-142188

(51) Int. Cl.$^7$ ................................................ G06F 9/30
(52) U.S. Cl. ...................................... 712/237; 712/207
(58) Field of Search ................................ 712/233–241, 712/208, 205–207

(56) References Cited

U.S. PATENT DOCUMENTS 5,764,946 A * 6/1998 Tran et al. ................... 712/239

FOREIGN PATENT DOCUMENTS

| JP | 7-73034 | 3/1995 |
|---|---|---|
| JP | 7-239781 | 9/1995 |
| JP | 2000-20308 | 1/2000 |

OTHER PUBLICATIONS

Breeding, Kenneth J., Microprocessor System Design Fundamentals, 1995, Prentice–Hall, p. 28.*

Kurian et al., Classification and performance evaluation of instruction buffering techniques, website, May 3, 2003, pp. 153, 157, IEEE Xplore.

Intel Architecture Software Developer's Manual–Instructions Formats and Encoding Appendix B; Order No. 243191; Intel; 1997; vol. 2; p. B1–B10.

* cited by examiner

*Primary Examiner*—Eddie Chan
*Assistant Examiner*—Tonia L. Meonske
(74) *Attorney, Agent, or Firm*—Leydig, Voit & Mayer, Ltd.

(57) ABSTRACT

A microprocessor avoids loss of instructions in a pre-fetch procedure when a branch instruction is received. When a new branch instruction that specifies a branch end is received by a queue buffer, all the instructions preceding the specified branch end are processed as an operand of the branch instruction. Moreover, the instruction word length of the branch instruction including the instruction that has been processed as the operand is output to a program counter, so the queue buffer is not flushed.

5 Claims, 3 Drawing Sheets

MICROPROCESSOR PROCESSING SPECIFIED INSTRUCTIONS AS OPERANDS

FIELD OF THE INVENTION

The present invention relates to a microprocessor having an instruction pre-fetching function. More particularly, this invention relates to a microprocessor which eliminates flushing, during execution of a branch instruction, in a queue buffer that stores the pre-fetch instructions.

BACKGROUND OF THE INVENTION

It is known that the method of pre-fetching instructions increases processing speed of a microprocessor. A group of instructions that have been stored in sequential addresses are sequentially executed in ordinary sequential computers. In contrast, in the instruction pre-fetch system, an instruction located several instructions ahead, which is expected to be used in the future, is taken out in parallel with the executing and decoding processes of the previous instruction.

In other words, an instruction, which has been preliminarily pre-fetched from a main memory or a cache, is stored in an instruction pre-fetch buffer (queue buffer) with a small capacity that enables high-speed access; thus, an attempt is made to virtually reduce a delay in the execution caused by memory access at the time of the instruction fetch.

In the conventional technique, when a branch instruction is executed, irrespective of the address of the branch end, the executions of pre-fetches and succeeding instructions are terminated, thereby flushing (clearing) the queue buffer; thus, instructions that have been stored before are nullified, and after a new pre-fetch has been made from the branch end address and the branch end instruction has been stored in the queue buffer, the execution of the instruction is resumed.

In this manner, in the conventional technique, the queue buffer is flushed before the execution of a branch instruction. Therefore, the number of pre-fetches disadvantageously increases, there is generated a disturbance in the pipeline process, and high speed can not be realized.

In Japanese Patent Application Laid-Open No. 7-73034, a comparison is made between the branch end address at the time of executing a branch instruction and the corresponding address range of the instruction located in the queue buffer, and when the branch end address is located within the corresponding address range, the instruction in the queue buffer is used without flushing the queue buffer, thereby making it possible to reduce the number of pre-fetches after the branch.

In this conventional technique, the number of pre-fetches after the branch is certainly reduced; however, since the branch instruction is dealt with as a normal non-conditional branch instruction, a complex address generation process is required for a branch after decoding the instruction, and the corresponding circuits become complex and bulky.

SUMMARY OF THE INVENTION

It is an object of this invention to provide a microprocessor which is free from unnecessary flushing in the queue buffer at the time of non-conditional branching process without the need of installing any complex structure therein.

The microprocessor according to one aspect of this invention comprises a main memory which stores instructions; a queue buffer which pre-fetches and stores instructions from the main memory; a program counter which generates an address on the main memory in which an instruction to be next executed is stored; an instruction decoder which receives and decodes instructions output from the queue buffer; and a queue controller controls input and output of instructions to the queue buffer based on the address generated and output from the program counter. The instruction decoder recognizes reception of a predetermined branch instruction, it processes all the instructions preceding a branch end specified by the branch instruction as an operand of the branch instruction, outputs an instruction word length of the branch instruction including the operand to the program counter thereby updating the address of the program counter, and provides a control so as not to flush the queue buffer.

Different from a normal branch instruction, a new branch instruction (for example, BJMP), which is operated in the same manner as a normal data transfer instruction, operation instruction, etc., is added to the microprocessor. The application of this branch instruction makes the number of instructions within the queue buffer variable. In other words, when the instruction decoder recognizes that an instruction input from the queue buffer is a predetermined brand instruction, it processes preceding instructions up to the branch end specified by this branch instruction as an operand of the corresponding branch instruction so that the number of instructions in the queue buffer is made variable. Then, the instruction word length of the corresponding branch instruction including the operand portion is output to the program counter, thereby updating the address of the program counter. Moreover, at the time of this branch instruction, the instruction decoder inhibits the queue buffer form being flushed.

The microprocessor according to another aspect of this invention comprises a main memory which stores instructions; a queue buffer which pre-fetches and stores instructions from the main memory; a program counter which generates an address on the main memory in which an instruction to be next executed is stored; an instruction decoder which receives and decodes instructions output from the queue buffer; and a queue controller controls input and output of instructions to the queue buffer based on the address generated and output from the program counter. The instruction decoder recognizes reception of a predetermined branch instruction, it processes all the instructions preceding a branch end specified by the branch instruction as NOP instructions, outputs an instruction word length corresponding to the branch instruction and the NOP instructions to the program counter thereby updating the address of the program counter, and provides a control so as not to flush the queue buffer.

When the instruction decoder recognizes that an instruction input from the queue buffer is a predetermined brand instruction (BJMP), it processes preceding instructions up to the branch end specified by this branch instruction (BJMP) as an NOP instruction, and the instruction word length of the corresponding branch instruction (BJMP) and the instruction word length corresponding to NOP instruction are output to the program counter, thereby updating the address of the program counter. Moreover, at the time of this branch instruction (BJMP), the instruction decoder inhibits the queue buffer form being flushed.

Other objects and features of this invention will become apparent from the following description with reference to the accompanying drawings.

DESCRIPTION OF THE PREFERRED EMBODIMENTS

Embodiments of the microprocessor in accordance with the present invention will be explained in detail below with reference to the accompanying drawings.

Figure 1:
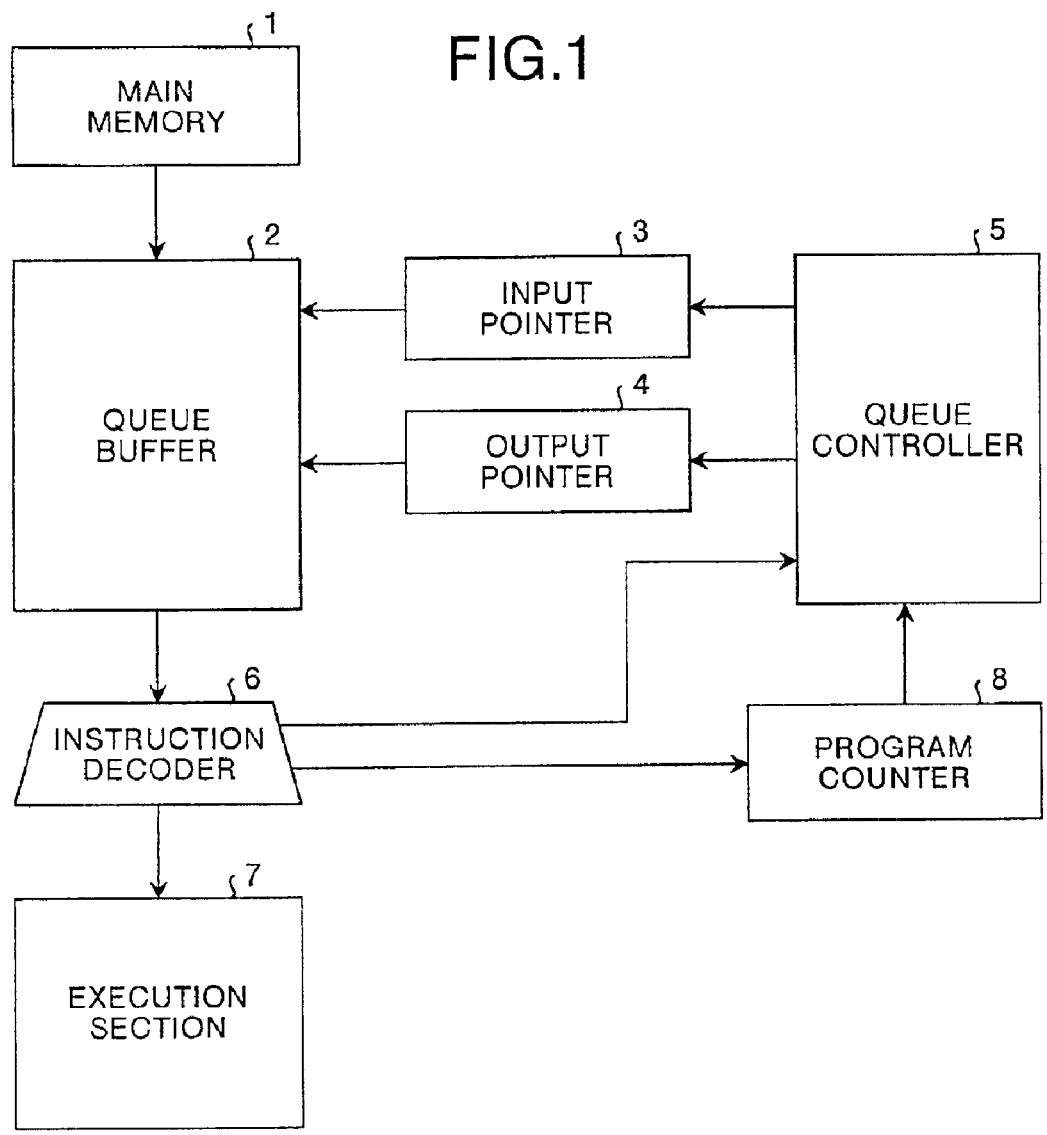
FIG. 1 is a block diagram that shows an example of an internal construction of a microprocessor in accordance with this invention.

FIG. 1 is a block diagram that shows an example of the inner structural the microprocessor in accordance with the present invention. In this figure, reference number 1 represents a main memory, 2 represents a queue buffer (instruction queue), 3 represents an input pointer, 4 represents an output pointer, 5 represents a queue controller, 6 represents a decoder, 7 represents an execution section, and 8 represents a program counter. The queue controller 5, the input pointer 3 and the output pointer 4 constitute a queue controller section that is disclosed in claims.

The main memory 1 stores instruction sequences for executing programs. The queue buffer 2 is a buffer which can store, for example, 32 instructions, and stores an instruction pre-fetched from the main memory 1. The instruction decoder 6 decodes (interprets) instruction codes of instructions read out from the queue buffer 2. The operation of the instruction decoder 6, which forms an essential subject of the present invention, will be described later.

The results of decoding in the instruction decoder 6 and the operand portion of the instruction are input to the execution section 7. By using the input results of decoding and operand portion, the execution section 7 carries out processes, such as data transfers, four-function operations, logical operations, size comparisons and shift operations, so as to execute instructions.

The program counter 8 is a register for storing execution addresses of the next instruction on the main memory 1, and carries out an operation so as to add the length of the instruction word given from the instruction decoder 6 to the current counter value (register value) of the program counter.

Based upon the output of the program counter 8 or the instruction decoder 6, the queue controller 5 controls the input pointer 3 and the output pointer 4 so that input-output controls of the instruction are carried out on the queue buffer 2. The input pointer 3 is incremented (or decremented) by a write control signal from the queue controller 5 so that a writing control operation is executed on the instruction pre-fetched from the main memory 1 to the queue buffer 2. The output pointer 4 is incremented (or decremented) by a read control signal from the queue controller 5 so that a reading control operation is executed on the instruction stored in the queue buffer 2 with respect to the instruction decoder 6.

Figure 2:
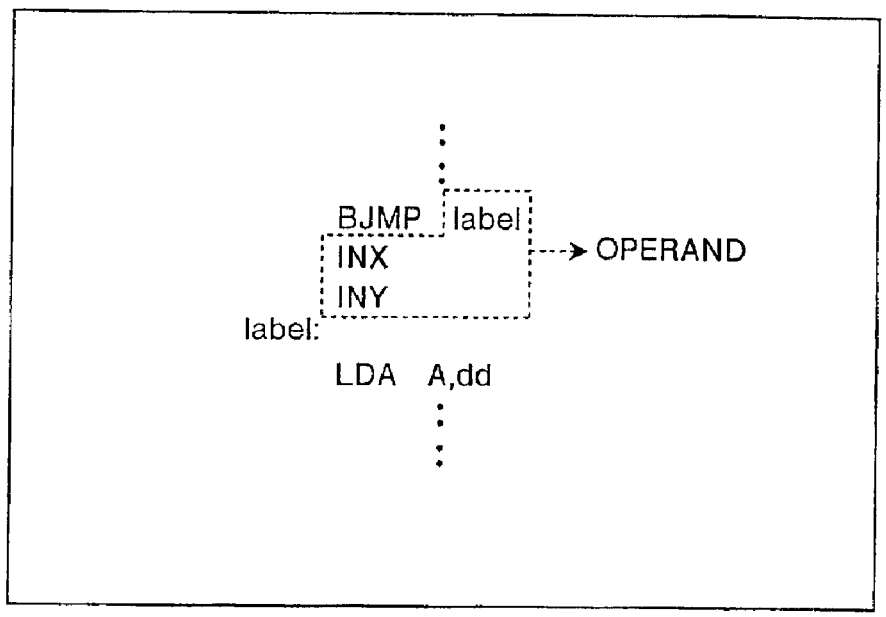
FIG. 2 is a drawing that shows an instruction sequence that explains a first embodiment of the present invention.

Referring to FIG. 2 in addition to FIG. 1, an explanation will be given about a first embodiment of the present invention. In the first embodiment, a new branch instruction "BJMP" is added to the microprocessor of FIG. 1 (FIG. 2). This branch instruction "BJMP" carries out processes different from a normal branch instruction; however, as a result, the same branch process as the normal branch instruction is carried out. Nevertheless, in the branch instruction "BJMP", the queue buffer 2 is not flushed at the time of the instruction execution. FIG. 2 conceptually shows instruction sequences stored in the queue buffer 2.

In the first embodiment, a label is specified on the operand section indicating the branch end of the branch instruction "BJMP".

In the instruction decoder 6 of FIG. 1, the instruction, input from the queue buffer 2, is decoded, and when it is recognized that the input instruction is a branch instruction "BJMP" as described above, preceding instructions (in this case, increment instructions; INX and INY) located up to a relative address specified by the label of the operand portion of this branch instruction "BJMP" are processed as an operand of the branch instruction "BJMP".

In other words, the instruction decoder 6 transmits a control signal for updating the output pointer 4 to the queue controller 5. Based upon this control signal, the queue controller 5 updates the output pointer 4. As a result, the next instruction (in this case, INX) is input from the queue buffer 2 to the instruction decoder 6. By decoding this input instruction, a judgment is made as to whether or not the instruction is a label. In this case, the instruction (INX) is not a label, the instruction decoder 6 further transmits a control signal to the queue controller 5, thereby updating the output pointer 4. In this manner, until a label has been detected, the instruction decoder 6 transmits the control signal to the queue controller so as to read the preceding instructions located up to the relative address specified by the label. Thus, the instruction decoder 6 detects the number of instructions of the instruction portion (in this case, INX and INY) to be processes as the operand and the instruction word length of the instruction portion to be processed as the operand.

Then, the instruction decoder 6 adds the instruction word length of the instruction portion (in this case, INX and INY) to be processed as the operand to the instruction word length of the branch instruction "BJMP", and outputs the results of the addition to the program counter 8 as the instruction word length of the corresponding branch instruction "BJMP". Moreover, the instruction decoder 6 outputs a predetermined control signal for inhibiting a flushing operation to the queue controller 5.

The program counter 8 adds the instruction word length of the branch instruction "BJMP" input from the instruction decoder 6 to the current address value, thereby updating the address value. Moreover, based upon the input of the control signal from the instruction decoder 6, the queue controller 5 does not carry out the flushing operation on the queue buffer 2.

Therefore, in this case, the next instruction (in this case, load instruction; LDA) to the relative address specified by the label is read from the queue buffer 2, and decoded by the instruction decoder 6; thus, as a result, the same process as a normal branch instruction is carried out.

In this manner, in the first embodiment, the preceding instruction codes up to the branch end specified by the label of the branch instruction "BJMP" are processed as an operand of the branch instruction "BJMP" so that the instruction codes up to the branch end are dealt as one instruction of the branch instruction "BJMP"; thus, as a result, it is possible to provide a variable number of instructions to be processed. In other words, by making the number of instructions variable, it is possible to obtain the same branch operation as the non-conditional branch operation.

In the first embodiment, the branch instruction "BJMP" is not operated as a normal branch instruction, but operated in the same manner as other data transfer instructions, operation instructions, etc., and this is not dealt as a normal branch instruction so that no flush is generated in the queue buffer 2; therefore, it is possible to further simplify the address operation at the time of branching as compared with the conventional method, and consequently to eliminate an unnecessary flushing operation of the queue buffer at the time of branching without the need of installing any complex structure therein. Therefore, it becomes possible to reduce re-fetching processes at the time of branching by using a simple structure, and consequently to improve the processing speed.

FIG. 2 showed a case in which preceding instructions located up to the relative address specified by a label are two. However, the number of instructions are of course set to one or three or more. Moreover, the instruction to which the operand of the branch instruction "BJMP" is given is not limited to the increment instructions INX, INY, shown in FIG. 2.

Figure 3:
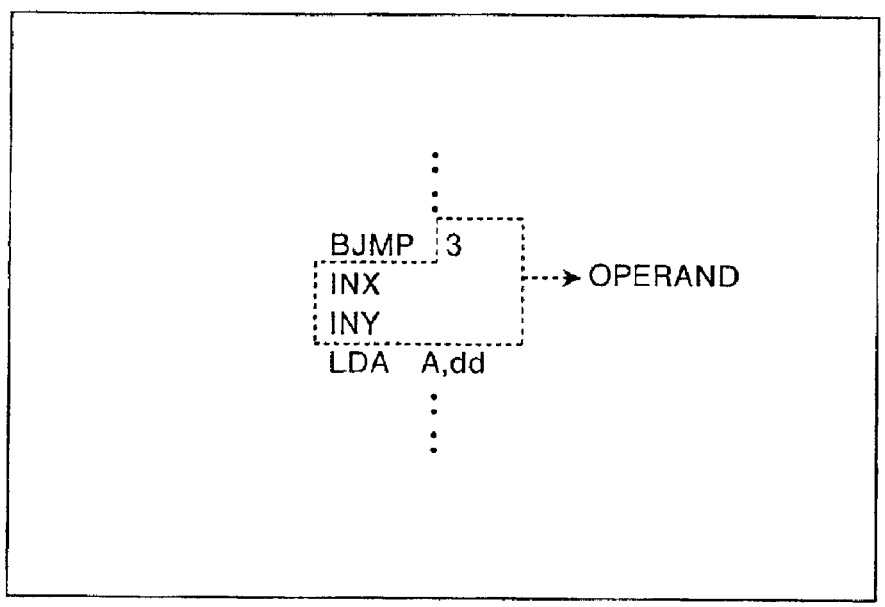
FIG. 3 is a drawing that shows an instruction sequence that explains a second embodiment of the present invention.

An explanation will be given about the second embodiment of the present invention while referring to FIG. 1 and FIG. 3. In the second embodiment, as illustrated in FIG. 3, the branch end of the branch instruction "BJMP" is specified by a relative address. In FIG. 3, "3" is specified as a relative address in the operand portion of the branch instruction "BJMP".

After having decoded an instruction input from the queue buffer 2 and recognized that the input instruction is the above-mentioned branch instruction "BJMP", the instruction decoder 6 processes preceding instructions (in this case, increment instructions; INX and INY), located up to the relative address specified by the relative address (in this case, "3") of the operand portion of the branch instruction "BJMP", are processed as an operand of the branch instruction "BJMP".

In other words, based upon the relative address (in this case, "3") of the operand portion of the branch instruction "BJMP", the instruction decoder 6 recognizes the number of instructions (in this case, "2") and the instruction word length of the instruction portion (in this case, INX and INY) to be processed as an operand, with respect to the queue controller 5.

Then, the instruction decoder 6 adds the instruction word length of the instruction portion (in this case, INX and INY) that has been processed as the operand to the instruction word length of the branch instruction "BJMP", and outputs the result of the addition to the program counter 8 as the instruction word length of the corresponding branch instruction "BJMP". Moreover, the instruction decoder 6 outputs a predetermined control signal for inhibiting a flushing operation to the queue controller 5.

The program counter 8 adds the instruction word length (including the instruction word lengths of INX and INY) of the branch instruction "BJMP" input from the instruction decoder 6 to the current address value, thereby updating the address value. Moreover, based upon the input of the control signal from the instruction decoder 6, the queue controller 5 does not carry out the flushing operation on the queue buffer 2.

Therefore, in this case, the instruction (in this case, load instruction; LDA) of the relative address specified by the operand portion of the branch instruction "BJMP" is read from the queue buffer 2, and decoded by the instruction decoder 6; thus, as a result, the same process as a normal branch instruction is carried out.

In this manner, in the second embodiment, the preceding instruction codes up to the branch end specified as the relative address in the operand portion of the branch instruction "BJMP" are processed as an operand of the branch instruction "BJMP" so that the instruction codes up to the branch end are dealt as one instruction of the branch instruction "BJMP"; thus, as a result, it is possible to provide a variable number of instructions to be processed. In other words, by making the number of instructions variable, it becomes possible to obtain the same branch operation as the non-conditional branch operation, in the same manner as the first embodiment.

In the second embodiment, the resulting operand length of the branch instruction "BJMP" is allowed to have a length corresponding to a relative address specified by the original operand portion of the branch instruction "BJMP" so that the operation corresponding to a normal branch instruction is carried out; therefore, it is possible to further simplify the address operation at the time of branching as compared with the conventional method, and consequently to eliminate an unnecessary flushing operation in the queue buffer at the time of branching without the need of installing any complex structure therein. Therefore, it becomes possible to reduce re-fetching processes at the time of branching by using a simple structure, and consequently to improve the processing speed.

FIG. 3 showed a case in which preceding instructions located up to the relative address specified by a label are two. However, the number of instructions are of course set to one or three or more. Moreover, the instruction to which the operand of the branch instruction "BJMP" is given is not limited to the increment instructions INX, INY, shown in FIG. 3.

Figure 4:
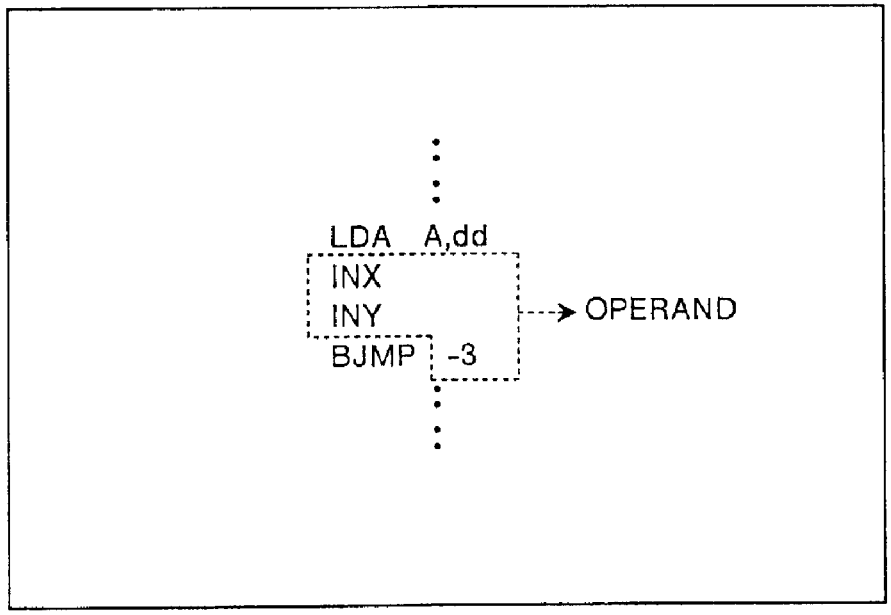
FIG. 4 is a drawing that shows an instruction sequence that explains a third embodiment of the present invention.

An explanation will be given about the third embodiment of the present invention while referring to FIG. 1 and FIG. 4. As illustrated in FIG. 4, in the third embodiment, the branch end of the branch instruction "BJMP" is specified by a relative address (in this case, "−3"). In this case, however, different from the second embodiment, it is possible to branch toward the minus address side.

In the third embodiment, the queue controller 5 carries out input-output controlling operations of the queue buffer so that preceding instructions up to the currently executing instruction, which correspond to a predetermined number (for example, "5") of relative addresses, are allowed to remain. In other words, the outputs of the respective pointers 3, 4 are allowed to always proceed with a gap corresponding to at least 5 addresses between the pointers 3 and pointer 4.

After having decoded an instruction input from the queue buffer 2 and recognized that the input instruction is the above-mentioned branch instruction "BJMP", the instruction decoder 6 processes preceding instructions (in this case, increment instructions; INX and INY), located up to the relative address specified by the relative address (in this case, "−3") of the operand portion of the branch instruction "BJMP", are processed as an operand of the branch instruction "BJMP".

In other words, based upon the relative address (in this case, "−3") of the operand portion of the branch instruction "BJMP", the instruction decoder 6 recognizes the number of instructions and the instruction word length of the instruction portion (in this case, INX and INY) to be processed as an operand, with respect to the queue controller 5.

Then, the instruction decoder 6 adds the instruction word length of the instruction portion (in this case, INX and INY) that has been processed as the operand to the instruction word length of the branch instruction "BJMP", and outputs the result of the addition to which the minus sign is added to the program counter 8 as the instruction word length of the corresponding branch instruction "BJMP". Moreover, the instruction decoder 6 outputs a predetermined control signal for inhibiting a flushing operation to the queue controller 5.

The program counter 8 adds the instruction word length of the branch instruction "BJMP" input from the instruction decoder 6 to the current address value, thereby updating the address value. Moreover, based upon the input of the control signal from the instruction decoder 6, the queue controller 5 does not carry out the flushing operation on the queue buffer 2.

Therefore, in this case, the instruction (in this case, load instruction; LDA) of the relative address (−3) specified by the operand portion of the branch instruction "BJMP" is read from the queue buffer 2, and decoded by the instruction decoder 6; thus, as a result, the same process as a normal branch instruction is carried out.

In this manner, in the third embodiment also, the preceding instruction codes up to the branch end having a minus address, specified as the relative address in the operand portion of the branch instruction "BJMP", are processed as an operand of the branch instruction "BJMP" so that the instruction codes up to the branch end are dealt as one instruction of the branch instruction "BJMP"; thus, as a result, it is possible to provide a variable number of instructions to be processed.

In the third embodiment, the resulting operand length of the branch instruction "BJMP" is allowed to have a length corresponding to a relative address specified by the original operand portion of the branch instruction "BJMP" so that the operation corresponding to a branch instruction to the minus address is carried out; therefore, it is possible to further simplify the address operation at the time of branching as compared with the conventional method, and consequently to eliminate an unnecessary flushing operation of the queue buffer at the time of branching without the need of installing any complex structure therein. Therefore, it becomes possible to reduce re-fetching processes at the time of branching by using a simple structure, and consequently to improve the processing speed.

FIG. 4 showed a case in which preceding instructions located up to the relative address specified by a label are two. However, the number of instructions are of course set to one or three or more. The upper limit of this is regulated by the number of instructions to be left in the queue buffer 2. Moreover, the instruction to which the operand of the branch instruction "BJMP" is given is not limited to the increment instructions INX, INY, shown in FIG. 4.

An explanation will be given about the fourth embodiment of the present invention while referring to FIG. 1 and FIG. 5. In the first to third embodiments, preceding instructions located up to the branch end are processed as an operand of the branch instruction "BJMP". However, since these instructions that have been operand-processed actually do not execute any instructions, no problem arises even when they are replaced by no operation (NOP).

For example, in the case of a processor that provides a high degree instruction set in the level of the assembler such as CISC's (Complex Instruction Set Computer), an assembly code for one instruction makes it possible to execute a very high-level process. In this case, any instruction in the operand that contains only descriptions and is not executed is replaced by NOP, and the instructions are then executed; thus, it becomes possible to execute the same branch operation as the aforementioned embodiments without the need of altering the number of instructions.

Figure 5:
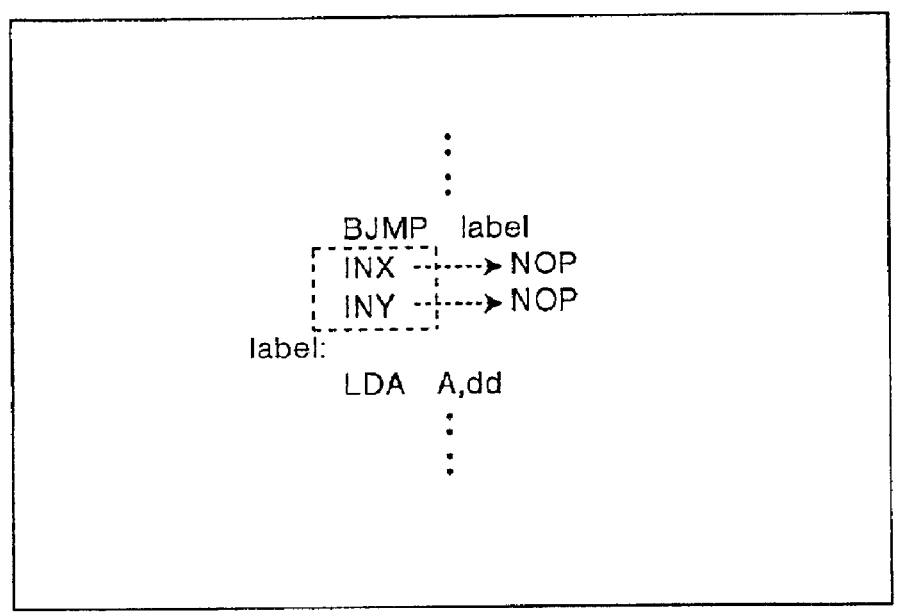
FIG. 5 is a drawing that shows an instruction sequence that explains a fourth embodiment of the present invention.

As illustrated in FIG. 5, in the fourth embodiment, a label is specified on the operand section indicating the branch end of the branch instruction "BJMP".

In this case, in the instruction decoder 6 of FIG. 1, the instruction, input from the queue buffer 2, is decoded, and when it is recognized that the input instruction is a branch instruction "BJMP" as described above, preceding instructions (in this case, increment instructions; INX and INY) located up to a relative address specified by the label of the operand portion of this branch instruction "BJMP" are processed as NOP.

In other words, the instruction decoder 6 transmits a control signal for updating the output pointer 4 to the queue controller 5. Based upon this control signal, the queue controller 5 updates the output pointer 4. As a result, the next instruction (in this case, INX) is input from the queue buffer 2 to the instruction decoder 6. The input instruction INX is processed as NOP. Moreover, the instruction decoder 6 transmits a control signal to the queue controller 5 so as to update the output pointer 4. By using this control signal, the queue controller 5 updates the output pointer 4. As a result, the next instruction (in this case, INY) is input from the queue buffer 2 to the instruction decoder 6. The input instruction INY is processed as NOP.

In this manner, until a label has been detected, the instruction decoder 6 transmits the control signal to the queue controller 5 so as to read the preceding instructions located up to the relative address specified by the label; thus, all of these are processed as NOP. In this case, each time the instruction is input from the queue buffer 2, the instruction decoder 6 sends the instruction word length corresponding to each instruction to the program counter 8. Moreover, the instruction decoder 6 outputs a predetermined control signal for inhibiting a flushing operation to the queue controller 5.

Each time the instruction word length (in this case, a normal word length corresponding to one instruction) is sent from the instruction decoder 6 thereto, the program counter 8 adds the instruction word length to the current address value, thereby updating the address value. Moreover, based upon the input of the control signal from the instruction decoder 6, the queue controller 5 does not carry out the flushing operation on the queue buffer 2.

Therefore, in this case, only the instruction (in this case, load instruction; LDA) at the relative address specified by the label is read from the queue buffer 2, and decoded by the instruction decoder 6; thus, as a result, the same process as a normal branch instruction is carried out without the number of instructions being changed.

In this manner, in the fourth embodiment, the preceding instruction codes up to the branch end specified by the label of the branch instruction "BJMP" are processed as NOP so that the same branch operation as the non-conditional branch is obtained without the number of instructions being changed. Therefore, it is possible to simplify address operations at the time of branching, and consequently to eliminate an unnecessary flushing operation of the queue buffer at the time of branching without the need of installing any complex structure therein. Therefore, it becomes possible to reduce re-fetching processes at the time of branching by using a simple structure, and consequently to improve the processing speed.

FIG. 5 showed a case in which preceding instructions located up to the relative address specified by a label are two. However, the number of instructions are of course set to one or three or more. Moreover, the instruction to which the NOP process is given is not limited to the increment instructions INX, INY, shown in FIG. 5.

In the above-mentioned respective embodiments, upon receipt of the branch instruction "BJMP", the instruction decoder 6 outputs a predetermined control signal for inhibiting the flushing to the queue controller 5; however, the flushing operation in the queue buffer 2 may be inhibited without particularly outputting the control signal to the queue controller 5. In this case, upon receipt of a control signal, the queue controller 5 carries out the flushing operation.

As described above, according to the microprocessor related to this invention, a new branch instruction (for example, BJMP) is added to the microprocessor, and preceding instructions up to the branch end specified by this branch instruction (BJMP) are processed as an operand of the corresponding branch instruction (BJMP) so that the number of instructions in the queue buffer is made variable, and the instruction word length of the corresponding branch instruction including the operand portion is output to the program counter, thereby updating the address of the program counter as well as inhibiting the queue buffer from being flushed at the time of this branch instruction (BJMP) Therefore, it is possible to further simplify the address operation at the time of branching as compared with the conventional method, and consequently to eliminate an unnecessary flushing operation of the queue buffer at the time of branching without the need of installing any complex structure therein. Thus, it becomes possible to reduce re-fetching processes at the time of branching by using a simple structure, and consequently to improve the processing speed.

Furthermore, since a label is used so as to specify the branch, it is possible to carry out the branching operation without specifying relative addresses up to the branch end. Moreover, it becomes possible to reduce re-fetching processes at the time of branching by using a simple structure, and consequently to improve the processing speed.

Furthermore, a relative address between the branch instruction and branch end is specified so as to specify the branch end. Therefore, it is possible to reduce re-fetching processes at the time of branching by using a simple structure, and consequently to improve the processing speed.

Furthermore, the queue controller section carries out the input-output controlling operation on the queue buffer so that a plurality of the previous instructions, which correspond to a predetermined number of relative addresses from the instruction that is currently being executed, are allowed to remain, and a minus relative address is specified as the relative address. Therefore, it is possible to make a branch toward the minus address side. Moreover, it becomes possible to reduce re-fetching processes at the time of branching by using a simple structure, and consequently to improve the processing speed.

Furthermore, a new branch instruction (for example, BJMP) is added to the microprocessor, and preceding instructions up to the branch end specified by this branch instruction (BJMP) are processed as an NOP instruction, and the instruction word length of the corresponding branch instruction and the NOP instruction is output to the program counter, thereby updating the address of the program counter as well as inhibiting the queue buffer from being flushed at the time of this branch instruction (BJMP). Therefore, it is possible to further simplify the address operation at the time of branching as compared with the conventional method, and consequently to eliminate an unnecessary flushing operation in the queue buffer at the time of branching without the need of installing any complex structure therein. Thus, it becomes possible to reduce re-fetching processes at the time of branching by using a simple structure, and consequently to improve the processing speed.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A microprocessor comprising:
a main memory which stores instructions;
a queue buffer which pre-fetches and stores instructions from the main memory;
a program counter which generates an address in the main memory in which an instruction to be next executed is stored;
an instruction decoder which receives and decodes instructions output from the queue buffer; and
a queue controller which controls input and output of instructions to the queue buffer based on the address generated and output from the program counter, wherein, when the instruction decoder recognizes reception of a branch instruction, the instruction decoder processes all the instructions preceding a branch end specified by the branch instruction as an operand of the branch instruction, outputs an instruction word length of the branch instruction including the operand to the program counter, thereby updating the address of the program counter, and prevents flushing of the queue buffer.

2. The microprocessor according to claim 1, wherein a label is used to specify the branch end.

3. The microprocessor according to claim 1, wherein a relative address between the branch instruction and branch end is specified to specify the branch end.

4. The microprocessor according to claim 3, wherein
the queue controller controls input and output of instructions to the queue buffer so that a plurality of previous instructions, which correspond to a number of relative addresses from the instruction that is currently being executed, remain in the queue buffer, and
a minus relative address may be specified as the relative address.

5. A microprocessor comprising:
a main memory which stores instructions;
a queue buffer which pre-fetches and stores instructions from the main memory;
a program counter which generates an address in the main memory in which an instruction to be next executed is stored;
an instruction decoder which receives and decodes instructions output from the queue buffer; and
a queue controller which controls input and output of instructions to the queue buffer based on the address generated and output from the program counter, wherein, when the instruction decoder recognizes reception of a branch instruction, the instruction decoder processes all the instructions preceding a branch end specified by the branch instruction as NOP instructions, outputs an instruction word length corresponding to the branch instruction and the NOP instructions to the program counter, thereby updating the address of the program counter, and prevents flushing of the queue buffer.

* * * * *